United States Patent [19]

Mankedick et al.

[11] Patent Number: 4,659,181

[45] Date of Patent: Apr. 21, 1987

[54] LIQUID CRYSTAL DISPLAYS AND METHOD BY WHICH IMPROVED APPARENT VIEWING CONES ARE ATTAINED THEREFOR

[75] Inventors: Robert G. Mankedick; Syed Naseem, both of Longwood, Fla.

[73] Assignee: NCR Corporation, Dayton, Ohio

[21] Appl. No.: 630,144

[22] Filed: Jul. 12, 1984

[51] Int. Cl.$^4$ ............................................. G02F 1/13
[52] U.S. Cl. ...................................... 350/332; 350/346
[58] Field of Search ................................. 350/332, 346

[56] References Cited

U.S. PATENT DOCUMENTS

| | | | |
|---|---|---|---|
| 3,790,251 | 2/1974 | Wysocki et al. | 350/332 X |
| 3,902,169 | 8/1975 | Washizuka | 350/332 X |
| 3,991,416 | 11/1976 | Byles et al. | 350/332 X |
| 4,385,806 | 5/1983 | Fergason | 350/332 X |

*Primary Examiner*—Bruce Y. Arnold
*Assistant Examiner*—Richard F. Gallivan
*Attorney, Agent, or Firm*—Stephen F. Jewett; Robert J. Clark

[57] ABSTRACT

Liquid crystal displays having improved apparent viewing cones are disclosed. The displays are activated by an electrical energizing signal which comprises an activation signal portion and a superimposed A.C. voltage signal by which the apparent viewing cone angles of the displays are increased.

10 Claims, 23 Drawing Figures

LIQUID CRYSTAL DISPLAYS AND METHOD BY WHICH IMPROVED APPARENT VIEWING CONES ARE ATTAINED THEREFOR

BACKGROUND OF THE INVENTION

This invention relates to liquid crystal displays, or LCD type devices as they are sometimes called in the art.

In a typical liquid crystal display, which is a field-effect type device, electrical fields are created and adjusted to control the optical properties of one or more layers of liquid crystal material. The manner of making and using such devices is well-known, and examples thereof are contained in U.S. Pat. No. 3,600,060, issued Aug. 17, 1971, to D. Churchill; U.S. Pat. No. 3,654,606, issued Apr. 4, 1972, to F. J. Marlowe et al.; U.S. Pat. No. 3,881,809, issued May 6, 1975, to J. L. Fergason et al.; U.S. Pat. No. 3,918,796, issued Nov. 11, 1975, to J. L. Fergason; U.S. Pat. No. 4,039,252, issued Aug. 2, 1977, to F. Mizuno et al.; U.S. Pat. No. 4,068,923, issued Jan. 17, 1978, to P. Toida; U.S. Pat. No. 4,224,617, issued Sept. 23, 1980, to C. R. Stein; U.S. Pat. No. 4,335,936, issued June 22, 1982, to K. Nonomura et al.; and U.S. Pat. No. 4,385,806, issued May 31, 1983, to J. L. Fergason.

LCDs are generally best viewed or read from particular directions or angles with respect to the display construction, as noted in U.S. Pat. No. 4,385,806. From some angles, there will be an insufficient apparent optical contrast between energized segments of the display and the display background. That is, the displayed symbols or characters will appear blurred or be difficult to discern.

The set or collection of angles or viewing lines from which the display may be effectively viewed defines what is here called the "apparent viewing cone". For a given display, the apparent viewing cone will have a specific shape and a specific orientation, and these will be characteristics of that particular display. A display may be viewed efficiently from angles within the apparent viewing cone, but not from other angles.

It is known that one can alter the orientation of the apparent viewing cone, without necessarily altering the apparent viewing cone shape, by increasing or decreasing the magnitude of the electric field by which the display elements are fully activated or energized. Thus, in manufactured display circuits there is often a potentiometer or similar component by which the energizing signal levels may be sometimes adjusted.

It is known to activate the display segments using an energizing signal which is purely a D.C. voltage. It is also known that in most displays it is not critical or important whether the energizing signal has a positive or a negative voltage potential. Thus, it has been understood that display segments may be activated using an energizing signal which is an A.C. voltage signal, such as an A.C. squarewave voltage signal, as has been used in a number of prior displays.

In U.S. Pat. No. 3,654,606, it is said that the operating life of the liquid crystal material can be extended by employing alternating voltage excitation rather than direct voltage excitation, and a circuit for providing an A.C. voltage energizing signal for an LCD is disclosed.

In U.S. Pat. No. 4,224,617, an LCD is disclosed in which the display electrodes are driven by sinusoidal or square waveforms of multiple frequencies and phases in a manner such that the electrode leads are maintained essentially invisible during the display operation.

In U.S. Pat. No. 4,335,936, a dot matrix type LCD is disclosed in which the electrode leads are common to multiple segments which may be individually activated by driving the electrodes with properly-timed square-wave voltage signals having multiple amplitudes. This type of driving method is sometimes called "multiplexing".

In order to activate the display segments in an LCD, the energizing signal conventionally has an "activation signal portion". The absolute value of the magnitude of this activation signal portion by definition exceeds the minimum voltage threshold level needed to cause the display segments to become activated or change optical states.

In U.S. Pat. No. 4,385,806 means are disclosed for improving the response time of liquid crystal displays in which the liquid crystal layer is relatively thick. The display electrodes are continuously biased by a D.C. voltage signal which is just below the minimum voltage threshold level needed to energize the display. A high frequency A.C. voltage signal is then superimposed upon the D.C. voltage biasing signal in order to produce a combined signal which energizes the display segments.

For purposes of additional background and disclosure, the specifications and drawings in all of the patents cited above are hereby incorporated by reference as if set forth fully herein.

SUMMARY OF THE INVENTION

This invention is directed to liquid crystal display type devices, that is, displays or devices which comprise: a layer of liquid crystal material; at least one electrode pair, comprising a pair of electrodes in register on opposite sides of the liquid crystal layer; a pair of oriented containment plates on opposite sides of the electrode pair; and means for providing an electrical energizing signal across the electrode pair, to drive the display, where such energizing signal comprises an activation signal portion of sufficient voltage potential to activate or change the optical state of the display. In accordance with the invention, means are provided for superimposing, upon the activation signal portion of the display energizing signal, an A.C. voltage signal having a frequency sufficient to increase the apparent viewing cone angle of the display.

The invention is further directed to a method for driving liquid display type devices. The method includes the steps of driving the display with an electrical energizing signal comprising an activation signal portion, and superimposing upon the activation signal portion an A.C. voltage signal, the frequency of which is sufficient to increase the apparent viewing cone angle of the display.

It is accordingly an object of this invention to increase the apparent viewing cone angle for conventional liquid crystal display type devices.

It is also an object of this invention to extend the applications for LCD devices by improving their readability to provide an increased number of directions or angles from which they may be effectively viewed.

It is further an object of the invention to provide LCD devices suitable for use in some applications normally utilizing more expensive display technology, such as the vacuum fluorescent display technology, where wider viewing cone angles are required.

Another object of this invention is to attain the foregoing objects by simple and cost-effective means.

BRIEF DESCRIPTION OF THE DRAWINGS

The above and other objects and features of this invention will become apparent from the detailed description given below, taken in connection with the accompanying drawings in which.

DETAILED DESCRIPTION OF EXEMPLARY AND PRESENTLY-PREFERRED EMBODIMENTS OF THE INVENTION

Figure 1:
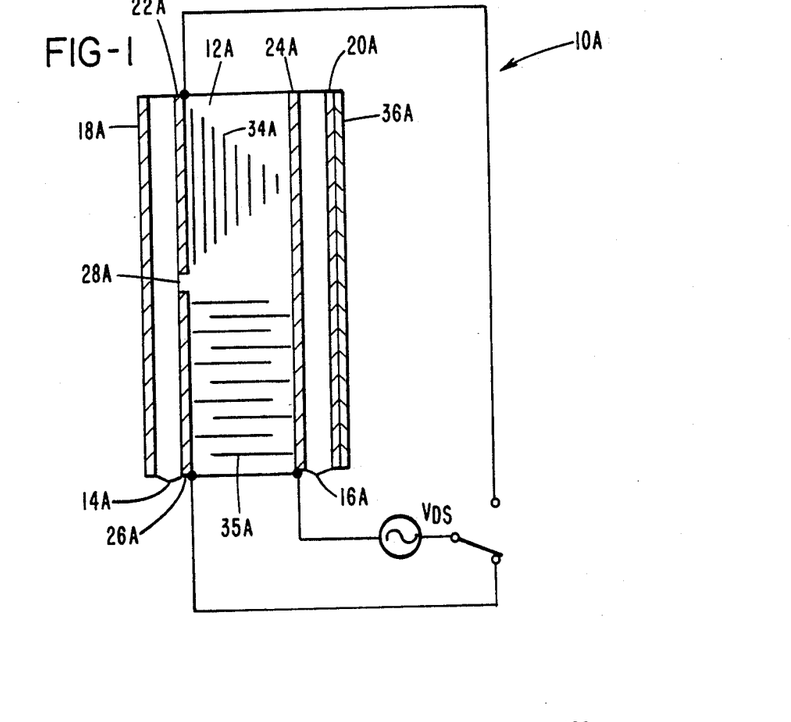
FIG. 1 shows a schematic of a simple conventional liquid crystal display.

FIG. 1 of the drawings shows a schematic of a simple conventional liquid crystal display 10A. The display 10A comprises a layer of liquid crystal material 12A sandwiched between a pair of parallel optically transparent containment plates 14A and 16A which are usually made of glass. As shown in FIG. 1, the pair of plates 14A and 16A are sandwiched between a pair of light polarizing sheets or polarizers 18A and 20A. The polarizing directions of the polarizers 18A and 20A may be the same or they may be skewed at an angle to one another, depending upon whether the display 10A is to be normally opaque or normally transparent to the incident light.

The display 10A has an electrode pair, comprising a pair of electrodes 22A and 24A in register on opposite sides of the layer 12A. The display 10A also includes a second electrode pair, comprising a pair of electrodes 24A and 26A. The electrodes 22A, 24A and 26A are optically transparent and can be in the form of electrically conductive films applied as coatings on the inside surfaces of the plates 14A and 16A. Such films can be indium oxide, tin oxide or a like composition applied to the plates 14A and 16A by vapor deposition or an equivalent process. The opposed electrode areas form the display segments and may be used to represent either display background or the indicia to be visualized on the display. The number, shape and location of the electrode pairs are determined accordingly.

The liquid crystal material is conventionally characterized by elongated molecules in a nematic state. That is, the molecules normally tend towards orientation with their long axes aligned in parallel lines but not in layers. The material is also typically a dielectric material which normally has a positive dielectric anisotropy. This means that the dielectric constant is a directionally dependent variable and that it has a maximum magnitude in the direction of the long axes of the material molecules.

The special properties of the liquid crystal material enable the layer 12A to be configured as a twisted structure in its normal or equilibrium condition. This twisted structure is transparent to light but it rotates or alters the direction of the vibrating electric field vector about the line of propagation of the incident light which is passed. This twisted structure is achieved by orienting the surfaces of the electrodes 22A, 24A and 26A and the adjacent uncoated surfaces 28A of the plates 14A and 16A, as by rubbing these surfaces in one direction with a piece of cloth, so that the liquid crystal molecules will tend to align with their long axes in the direction of rubbing.

Figure 2:
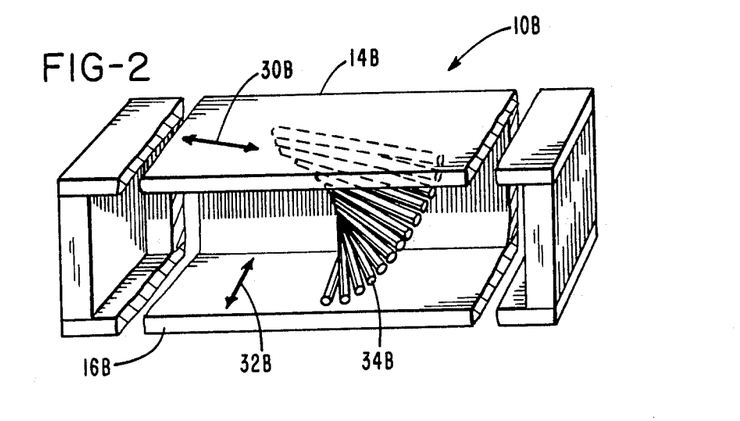
FIG. 2 is a sectioned perspective view of a display as in FIG. 1, illustrating by exaggeration a twisted structure formed by unexcited liquid crystal molecules.

FIG. 2 illustrates a display 10B comprising containment plates 14B and 16B. FIG. 2 shows a direction 30B of rubbing the plate 14B, and a direction 32B of rubbing the plate 16B. The plates 14B and 16B are thus said to be "oriented". FIG. 2 also illustrates by exaggeration the associated twisted structure formed by unexcited liquid crystal molecules 34B sandwiched between the plates 14B and 16B. The twisted structure of the molecules 34B is attained by skewing the directions 30B and 32B, as by setting the two directions 90° apart or nearly 90° apart.

Referring back to FIG. 1, the parallel lines 34A shown in the layer 12A between the pair of electrodes 22A and 24A are provided to signify the presence of a twisted crystalline structure as shown in FIG. 2.

In FIG. 1, an electrical energizing signal or voltage $V_{DS}$ is applied across the pair of electrodes 24A and 26A, and electric dipole moments are induced in the liquid crystal molecules between these two electrodes. These dipole moments point along the long axes of the liquid crystal molecules in which they are induced, and align in the direction of the electric field between the pair of electrodes 24A and 26A. The result is an untwisted structure made up of the affected liquid crystal molecules.

In FIG. 1, the parallel lines 35A between the pair of electrodes 24A and 26A are provided to indicate the direction of alignment of the liquid crystal molecules between the energized display segments. The liquid crystal structure between the energized display segments or pair of electrodes 24A and 26A will be transmissive of light, but since the structure is not twisted, the incident light will be transmitted without rotation of its vibrating electric field vector.

To provide a visible contrast between those portions of the liquid crystal layer 12A which have a twisted structure and those which do not, the pair of polarizers 18A and 20A is used. If the polarizing directions of the polarizers 18A and 20A are the same, the incident light will be blocked by the polarizers 18A and 20A except where they overlie the electrode 26A. If the polarizing directions are skewed, the polarizers 18A and 20A will block the incident light except where they overlie the electrode 22A and the uncoated surfaces 28A. A reflective surface 36A may be disposed against the outside surface of the polarizer 20A and facing the layer 12A, to return transmitted incident light to the viewer, or alternatively, a light source (not shown) may be provided as a source of viewing light to be transmitted through the optically transparent portions of the display 10A.

Figure 3:
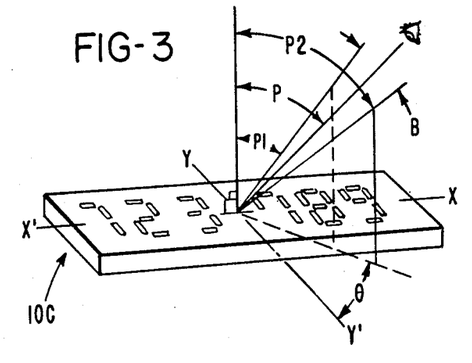
FIG. 3 shows a planar section of the viewing cone of a liquid crystal display.

FIG. 3 illustrates a liquid crystal display 10C on which the activated display segments are readable as a line of numbers. In this example, the apparent viewing cone parameters are shown in reference to a plane which is normal to the lengthwise axis X-X' of the display 10C, and which intersects the center of the display 10C along its axis Y-Y'. The intersection of this plane with the apparent viewing cone of the display 10C is represented by the two viewing lines respectively shown at angles P1 and P2. In the reference plane, the viewing lines which are within the apparent viewing cone of the display 10C are at an angle P, where P is greater than or equal to P1 and less than or equal to P2. The difference between the angles P2 and P1 is designated by the angle B, which is the apparent viewing cone angle of the display 10C in the depicted plane of reference.

Figure 4:
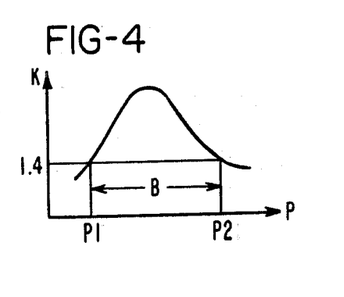
FIG. 4 is a graphical representation of the relation between viewing cone boundary angles P1 and P2, shown in FIG. 1, and the contrast ratio K.
Figure 5:
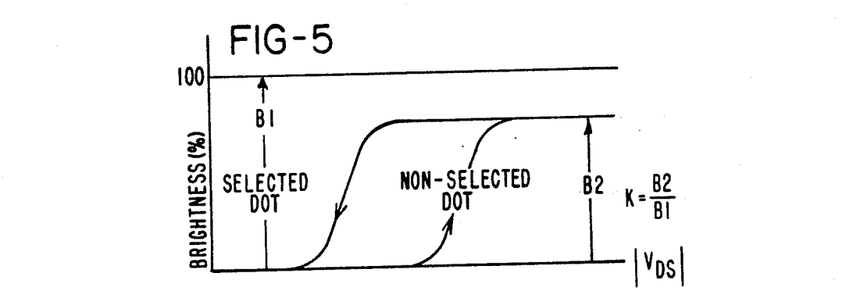
FIG. 5 is a graphical representation of the relation between the contrast ratio K shown in FIG. 4 and the percentage brightness of selected and non-selected display segments.

FIGS. 4 and 5 illustrate the manner of determining angles P1 and P2 shown in FIG. 3. FIG. 4 shows a graphical relation between a contrast ratio K as a function of the angle P, which relation is in the form of a bell curve. The angles P1 and P2 are taken to be the angles P for which the contrast ratio K is 1.4. The contrast ratio K is a measure of the readability of the display 10C, such that when the value of K is less than about 1.4, the readability of the display 10C is determined to be unacceptable. As shown in FIG. 5, the contrast ratio K is calculated as the quotient of B1/B2, where B2 is the brightness of a nonselected dot or display segment and B1 is the brightness of a dot or display segment which has been selected or fully energized. B1 and B2 are measured with the energizing signal voltage $V_{DS}$ of the display 10C within normal operating limits.

FIGS. 6A-6D show examples of waveforms for electrical energizing signals $V_{DS}$ which are in accordance with the invention. As described earlier in connection with FIG. 1, the electrical energizing signals $V_{DS}$ are those signals which are made to appear across the display electrodes to activate or change the optical state of the display segments. In FIGS. 6A-6D the value $V_T$ is used to indicate the minimum voltage threshold level needed to cause the display segments to become activated or change states. When the signal $V_{DS}$ is above $V_T$ or below $-V_T$ for a sufficient time, the display is activated.

Figure 6A:
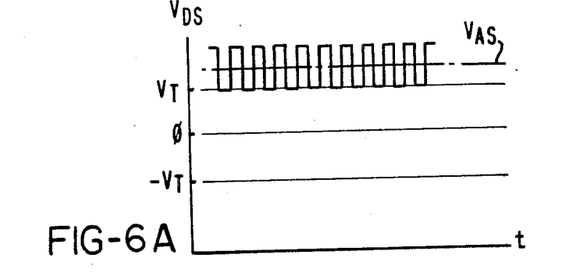
FIGS. 6A-6D show examples of waveforms for electrical energizing signals which are in accordance with this invention.

As will be seen in FIG. 6A, the electrical energizing signal $V_{DS}$ comprises an activation signal portion $V_{AS}$ which may consist of a continuously applied DC voltage signal as shown. As indicated, the absolute value of the magnitude of the activation signal portion $V_{AS}$ exceeds the minimum voltage threshold level $V_T$. In accordance with the invention, as shown in FIG. 6A, an AC voltage signal is superimposed upon the activation signal portion $V_{AS}$, where this AC voltage signal has a frequency sufficient to increase the apparent viewing cone angle for the display. In this illustrated example, the superimposed A.C. voltage signal has a square waveform, although it may alternatively have other waveforms.

Figure 6B:
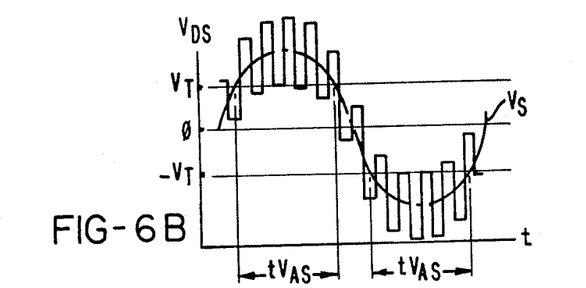

In the example shown in FIG. 6B, the energizing signal $V_{DS}$ comprises a sinusoidal waveform $V_S$. The activation signal portion of $V_{DS}$ is represented by and consists of the peaks of the signal $V_S$ which are above $V_T$ or below $-V_T$, that is, the portions of the signal $V_S$ which fall within the illustrated time periods $t_{VAS}$. As shown, an A.C. voltage signal having a square waveform is superimposed upon the activation signal portion of the energizing signal $V_{DS}$.

Figure 6C:
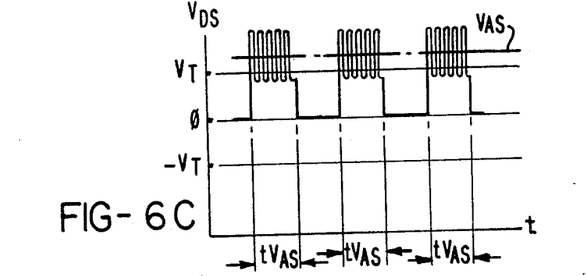

In the example illustrated in FIG. 6C, the energizing signal $V_{DS}$ comprises an activation signal portion $V_{AS}$ consisting of positive going pulses which regularly recur during the illustrated time periods $t_{VAS}$. In this example, the A.C. voltage signal which is superimposed has a sinusoidal waveform.

Figure 6D:
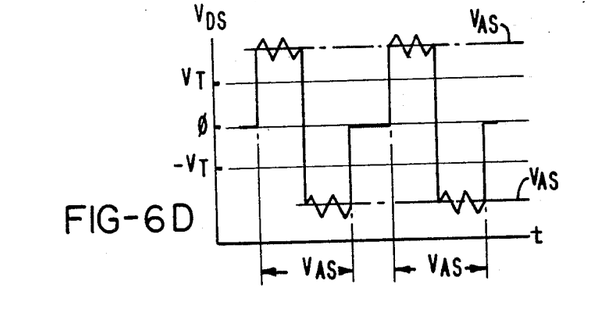

In FIG. 6D, a case is illustrated where the activation signal portion $V_{AS}$ consists of alternating positive and negative going regularly recurring pulses and the superimposed AC voltage signal has a sawtooth waveform.

In accordance with the invention, the frequency of the superimposed A.C. voltage signal is set to a value sufficient to increase the apparent viewing cone angle for the display. In cases where the activation signal portion of the electrical energizing signal is discontinuous or consists of pulses, it is preferred and can be critical that the frequency of the superimposed A.C. voltage signal is greater than the inverse of the duration of such pulses. Thus, where the display is driven by multiplexing, the frequency of the A.C. voltage signal would preferably be greater than the utilized multiplexing rate. The frequency of the superimposed A.C. voltage signal is not otherwise a critical factor, and will be typically set so as to maximize the breadth of the apparent viewing cone of the display. Likewise, the amplitude or magnitude of the peak-to-peak voltage swing of the superimposed A.C. voltage signal will not normally be a critical factor. The amplitude will be selected within the limits of operability and ideally set so as to maximize improvement of the apparent viewing cone.

Circuitry capable of producing a desired electrical energizing signal in accordance with this invention can be constructed using readily available components and well-known circuit design techniques.

An example presenting the presently-preferred embodiment of the invention is set forth below.

EXAMPLE

Figure 7:
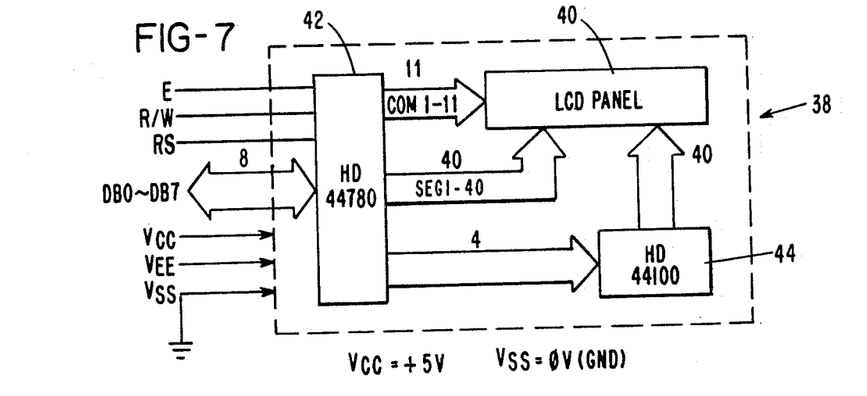
FIG. 7 shows a schematic of a particular LCD module, comprising a dot matrix LCD panel and CMOS driver circuit components, used to illustrate the presently-preferred embodiment of the invention.

Shown in FIG. 7 is a block diagram schematic for an LCM-512-01A LCD dot matrix display module made by Sanyo Semiconductor Corporation. This module, designated as module 38 in FIG. 7, comprises an LCD panel 40 driven by multiplexing and configured for displaying a line of up to 16 characters in dot matrix format. The characters may be displayed in one of two formats, a 5×7 font and a 5×10 font. The module 38 has 6 input terminals plus an 8-bit wide I/O port for parallel communication of digital data or instruction bit signals DB0-DB7. The module 38 is adapted for being interfaced with a microcomputer (not shown).

The 8-bit wide I/O port of the module 38 is used to input instruction bits sent by the microcomputer to control and set optional functions within the module 38. The port is also used to receive data bits sent by the microcomputer to designate characters to be displayed on the LCD panel 40. Characters actively displayed on the LCD panel 40 can be read by the microcomputer via data bits output on the 8-bit wide port of the module 38. The illustrated input signal E is an operation start signal to initiate data read or write operations. The input signal R/W is used to select between read and write operations. The input signal RS is used to select between operations involving instructions and operations involving data movement. The input signal $V_{CC}$ is the main power supply for the module 38 and is normally set to a constant D.C. voltage level of +5 volts. The input signal $V_{SS}$ is the ground level input for the module 38. The input signal $V_{EE}$ is used to set the energizing signal level for driving the LCD panel 40. The absolute value of the maximum level of the energizing signal for the LCD panel 40 is the difference between $V_{CC}$ and $V_{EE}$. In order to avoid drive latch-up in this particular module 38, the maximum value of $V_{EE}$ should always be less than the value of $V_{CC}$.

As shown in FIG. 7, the module 38 includes an HD 44780 CMOS LSI controller and driver circuit, designated as controller-driver 42. The controller-driver 42 contains the primary intelligence of the module 38, and directly drives the 8 leftmost character positions on the LCD panel 40. The module 38 also includes an HD 44100 CMOS LSI driver circuit, designated as driver 44, which is a slave to the controller-driver 42 for driving the 8 rightmost character positions on the LCD panel 40.

Figure 8:
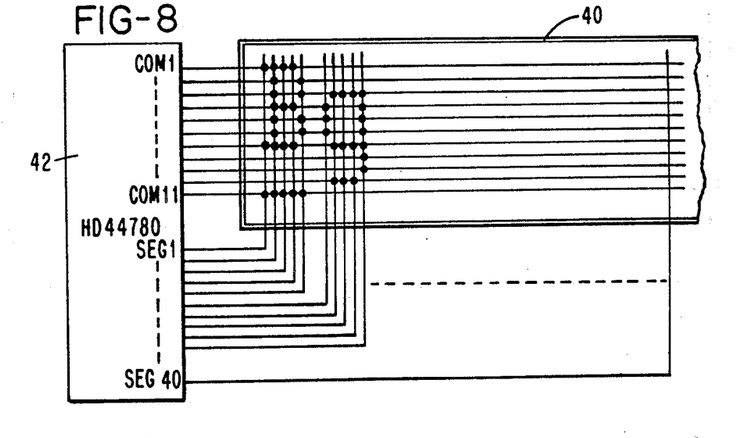
FIG. 8 shows a schematic of the relationship and connection of electrodes for the LCD panel shown in FIG. 7, and their connection to one of the driver circuits shown in FIG. 7.

FIG. 8 illustrates the electrode connections between the LCD panel 40 and the controller-driver 42 shown in FIG. 7. The display of two dot matrix characters in a 5×10 font in the two leftmost character positions of the LCD panel 40 is illustrated. The driving electrodes on one side of the liquid crystal layer of the LCD panel 40 are formed by 11 common lines, COM1 through COM11, which run the length of the LCD panel 40. For driving the 8 leftmost character positions on the LCD panel 40, electrodes are formed on the opposite side of the liquid crystal layer of the LCD panel 40 by forty common lines designated as SEG1 through SEG40. The display segments or dot positions on the LCD panel 40 are defined by the apparent intersections of lines COM1 through COM11 and lines SEG1 through SEG40 as viewed in FIG. 8.

Figure 9A:
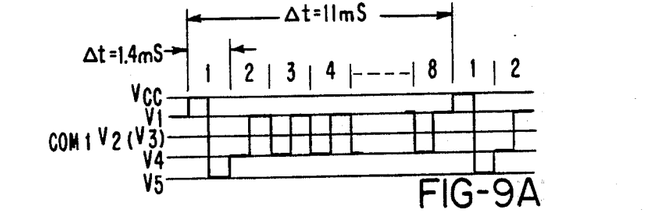
FIGS. 9A-9F show conventional waveforms for multiplexing the LCD panel shown in FIG. 7.
Figure 9B:
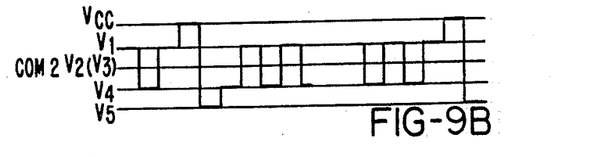
Figure 9C:
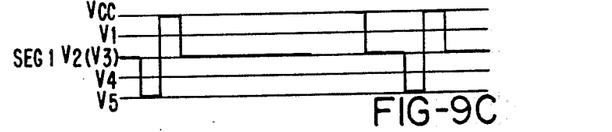
Figure 9D:
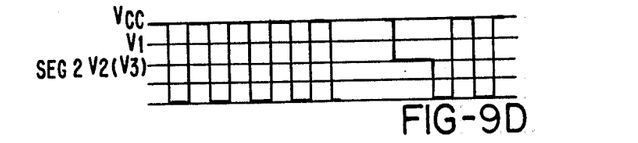
Figure 9E:
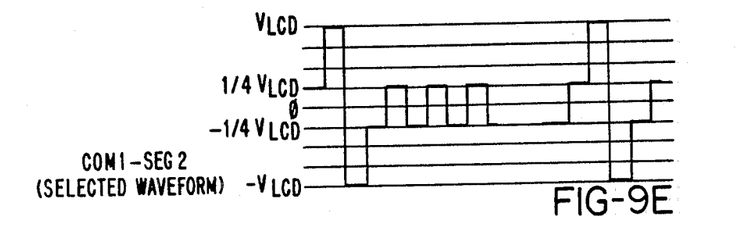
Figure 9F:
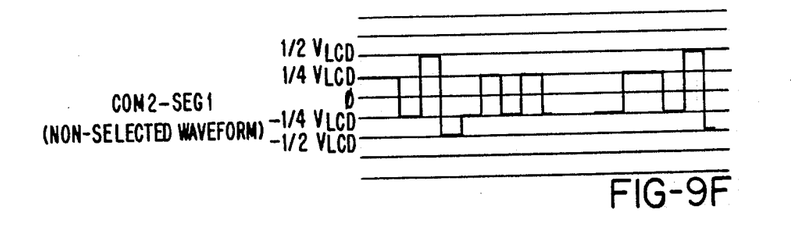
Figure 9G:
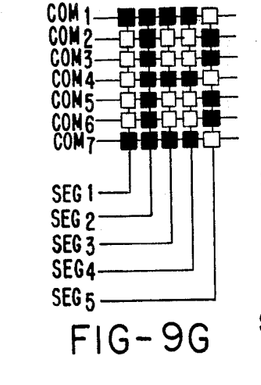
FIG. 9G shows a schematic of the leftmost character position of the LCD panel shown in FIG. 7, together with the associated electrodes and signal carrier lines for driving that character position.

In FIG. 9G, the capital letter "B" is shown being displayed in a 5×7 dot matrix font by display segments activated by signals carried on lines COM1 through COM7 and SEG1 through SEG5. The display segments shown in FIG. 9G correspond to the leftmost character position of the 16-character display on LCD panel 40 shown in FIGS. 7 and 8. FIGS. 9A-9D show waveforms for the signals carried on lines COM1, COM2, SEG1 and SEG2, respectively. The waveforms for the signals carried on lines COM3 through COM7 and SEG3 through SEG5 are similar to those shown in FIGS. 9A-9D. The waveforms shown in FIGS. 9E and 9F represent the electrical energizing signals across the two display segment electrode pairs formed at the intersections of lines COM1 with SEG2 and COM2 with SEG1, respectively. The relationship between the voltage levels of the waveforms shown in FIGS. 9A-9D and the waveforms shown in FIGS. 9E-9F are as follows:

$$V_{LCD} = V_{CC} - V_{EE}$$

$$V_1 = V_{CC} - \tfrac{1}{6} V_{LCD}$$

$$V_2(V_3) = V_{CC} - \tfrac{1}{3} V_{LCD}$$

$$V_4 = V_{CC} - \tfrac{5}{6} V_{LCD}$$

$$V_5 = V_{CC} - V_{LCD}$$

The illustrated waveforms in FIGS. 9A-9F each consist of a plurality of pulses which recur regularly with a cycle period about 11 milliseconds. Each waveform cycle has 8 phases, numbered 1 through 8 respectively, of about 1.4 milliseconds each in duration, for displaying characters in a 5×7 font. The waveforms of the signals carried on lines COM1 through COM7 consist of a plurality of pulses which have a fixed range of amplitudes over seven of the eight phases during each waveform cycle, and an increased range of amplitudes in the remaining phase. The signals carried on lines COM1 through COM7 are identical except that each is offset from the others by one or more phase periods. Dot selection is accomplished by the amplitude modulation and timing of the signals carried on lines SEG1 through SEG5.

Figure 12A:
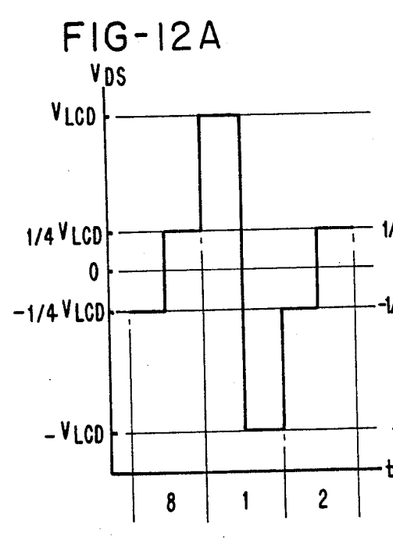
FIG. 12A shows the activation signal portion of the waveform shown in FIG. 9E, as produced with the conventional input voltage signal shown in FIG. 10A.

The difference in potentials between intersecting lines COM1 through COM7 and SEG1 through SEG5 represent the electrical energizing signals across the electrodes which drive the respective dot positions. FIG. 9E illustrates the waveform which drives the selected or activated dot position at the intersection of lines COM1 and SEG2. FIG. 9F illustrates the waveform for the electrical energizing signal which is seen across the electrodes at the nonselected or inactive dot position at the intersection of lines COM2 and SEG1. The significant difference between the waveforms shown in FIGS. 9E and 9F is that the voltage amplitude swings between $V_{LCD}$ and $-V_{LCD}$ in FIG. 9E, whereas in FIG. 9F the voltage varies between $\tfrac{1}{2} V_{LCD}$ and $-\tfrac{1}{2} V_{LCD}$. It will thus be apparent that the minimum voltage threshold level needed to cause the display segments to become activated or change states lies somewhere between the values of $V_{LCD}$ and $\tfrac{1}{2} V_{LCD}$. The activation signal portion of the waveform shown in FIG. 9E is that portion of the waveform which occurs each cycle in phase period 1, shown in greater detail in FIG. 12A.

Figure 10A:
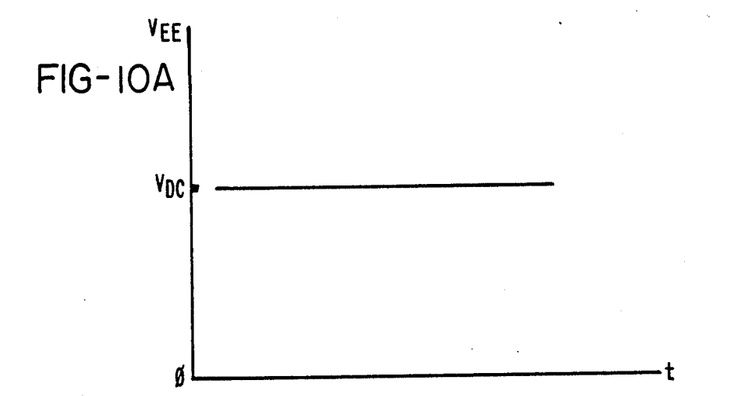
FIG. 10A shows a conventional input voltage signal which is an input for the LCD module shown in FIG. 7.

FIG. 10A shows the waveform for the conventional $V_{EE}$ signal input for the module 38 shown in FIG. 7. Thus, $V_{EE}$ is conventionally a continuously applied DC voltage. For the present example, the value of $V_{EE}$, that is $+V_{DC}$, was varied between $\tfrac{1}{2}$ volt to 2 volts, using a waveform as shown in FIG. 10A, and the orientation and shape of the apparent viewing cone were measured for the module 38 shown in FIG. 6. With $V_{DC}$ at $\tfrac{1}{2}$ volt, the angle P1 was about 0° and the angle B was about 25° with the two angles being measured as shown in FIG. 3 (for $\theta = 0°$). When the value of $V_{DC}$ was increased to about 2 volts, the angle P1 was measured as being about 60°, whereas the angle B remained nearly constant at about 25°.

Figure 10B:
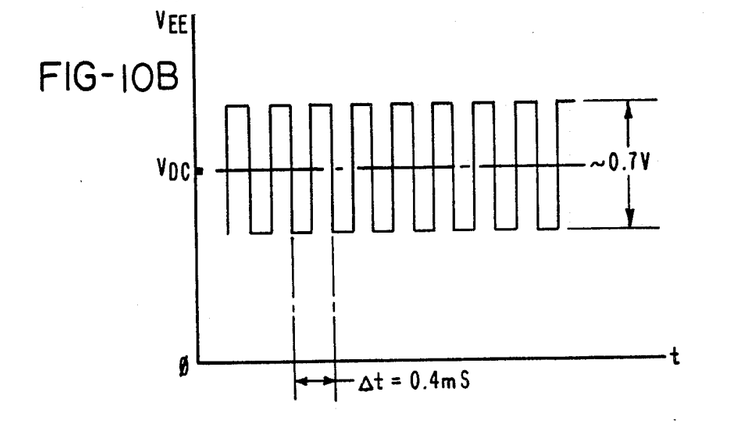
FIG. 10B shows an input voltage signal in accordance with this invention, used in place of the signal shown in FIG. 10A.
Figure 12B:
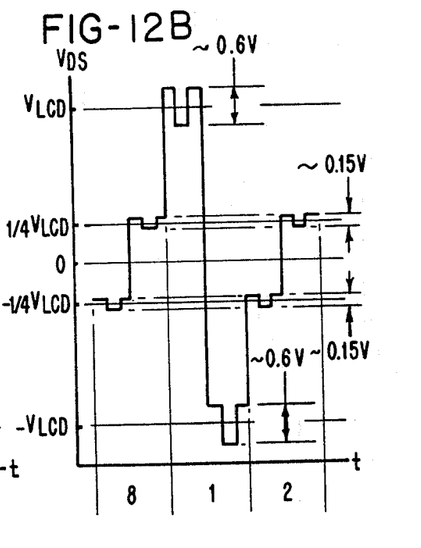
FIG. 12B shows the activation signal portion of the waveform shown in FIG. 9E, modified in accordance with the invention by a superimposed A.C. voltage signal, as produced with the input voltage signal shown in FIG. 10B.

The advantages of the present invention were illustrated by modifying the $V_{EE}$ input signal by using the waveform shown in FIG. 10B. It will be seen that the waveform shown in FIG. 10B is identical to that shown in FIG. 10A, except that it is modified by a superimposed A.C. voltage signal having a frequency of about 2.4 KHz and a peak-to-peak voltage amplitude swing of about 0.7 volts. The resultant electrical energizing signal $V_{DS}$ across the electrodes driving a selected dot position is shown in pertinent part in FIG. 12B. The activation signal portion of the waveform shown in FIG. 12B occurs in phase period 1 and consists of two pulses, one having an amplitude equal to $V_{LCD}$ and the other having an amplitude equal to $-V_{LCD}$. Superimposed upon this activation signal portion is an A.C. voltage signal having a peak-to-peak voltage swing of about 0.6 volts and a frequency of about 2.4 KHz, which is about three times the multiplexing rate, and about 1.5 times the inverse of the duration of each of the two pulses which make up the activation signal portion occurring in phase period 1 of the illustrated waveform. As a result of this superimposed A.C. voltage signal, the apparent viewing cone angle B was observed to increase 3°-5° to have a measured value which was between 28° and 30°. The angle P1, measured as shown in FIG. 3, was found to depend upon and have the same relation to the value of $V_{LCD}$ as was the case with $V_{EE}$ being the conventional signal shown in FIG. 10A.

Figure 11:
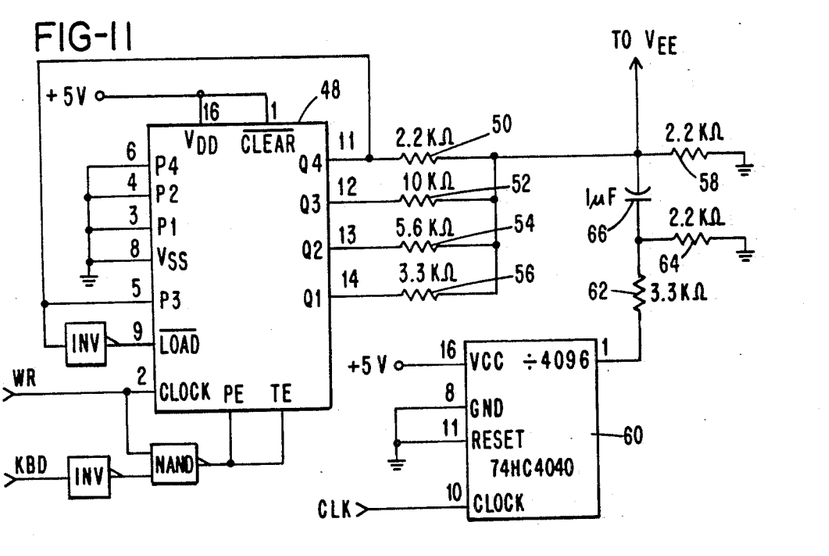
FIG. 11 shows a schematic for a circuit for producing the signal shown in FIG. 10B, this circuit being adapted for control by a microcomputer.

FIG. 11 illustrates the circuit 46 used to produce the waveforms shown in FIG. 10B. The circuit 46 as illustrated is adapted to be controlled by a microcomputer (not shown). The circuit 46 comprises a CMOS MSI synchronous programmable 4-bit binary counter 48. The counter 48 is wired to count in the up direction from binary 4 through binary 8 in repetitive fashion. The binary count is represented by the state of outputs Q1-Q4, with Q1 representing the least significant binary bit. Unselected outputs Q1-Q4 represent binary zeros and are at ground potential. Selected outputs Q1-Q4 represent binary 1's and are at a potential of +4.8-5.0 volts. The counter 46 is thus used to supply a source voltage of +4.8-5.0 volts through a variable source impedance provided by a 5 resistor network consisting of resistors 50 through 58. The counter 48 is positive edge clocked, and advances the binary count by one on each ground-to-positive transition of the clock signal WR if the chip enable signal KBD is high. The signals WR and KBD may be sent or triggered by a microcomputer (not shown).

The circuit 46 also includes a CMOS 12-stage (divide-by-4096) binary ripple counter 60 that counts in the up direction using positive logic. The counter 60 is employed as a frequency divider in the circuit 46. The divide-by-4096 output of the counter 60 is an A.C. squarewave voltage signal which steps between ground potential and +4.8 to 5.0 volts with a cyclical frequency of 1/4096th of the frequency of the squarewave clocking signal input CLK. As operated in this example, the signal CLK had a frequency of about 9.83 MHz and the divide-by-4096 output of the counter 48 had a frequency of about 2.4 Hz. The divide-by-4096 output of the counter 60 is stepped down through the voltage divider consisting of resistors 62 and 64 and coupled to the output terminal of the circuit 46 through capacitor 66.

As the binary count of the counter 48 was advanced from binary 4 through binary 8, the D.C. voltage component of the output voltage signal $V_{EE}$ of the circuit 46 ranged from about +0.6 to 2.2 volts. The $V_{EE}$ voltage signal output of the circuit 46 had an A.C. squarewave voltage component with a peak-to-peak voltage amplitude swing of about 0.7 volts and a frequency of about 2.4 KHz which remained essentially constant over the range of binary counting by the counter 46.

While only a limited number of embodiments of this invention have been described above, it will be appreciated that the invention may be embodied and practiced in other forms. The invention is to be defined and limited only by the scope of the following claims.

What is claimed is:

1. In a liquid crystal display of the type which comprises a circuit for driving the display with an electrical energizing signal, said energizing signal comprising an activation signal portion; the improvement wherein said display further comprises means for superimposing an A.C. voltage signal upon said activation signal portion.

2. The liquid crystal display of claim 1 wherein the display is of a type which is driven by multiplexing and said energizing driving signal comprises a plurality of regularly recurring pulses of multiple amplitudes, with said activation signal portion consisting of at least one of said pulses.

3. The liquid crystal display of claim 2 wherein the frequency of said A.C. voltage signal is greater than the inverse of the duration of each of said pulses.

4. A liquid crystal display, which comprises:
   a layer of liquid crystal material;
   an electrode pair, comprising a pair of electrodes on opposite sides of said layer;
   a pair of oriented containment plates on opposite sides of said electrode pair; and
   means for providing an electrical energizing signal across said electrode pair, to drive the display, said energizing signal comprising:
   (i) an activation signal portion of sufficient voltage potential to activate or change the optical state of the display; and
   (ii) an A.C. voltage signal superimposed upon said activation signal portion, said A.C. signal having a frequency sufficient to increase the apparent viewing cone angle for the display.

5. The liquid crystal display of claim 2 wherein said display comprises a pair of polarizers on opposite sides of said pair of containment plates.

6. The liquid crystal display of claim 5 wherein said display comprises a reflective surface against the outside surface of one of said polarizers and facing said layer of liquid crystal material.

7. In a liquid crystal display of the type comprising: a layer of liquid crystal material; an electrode pair in the form of a pair of optically transparent electrodes in register on opposite sides of said layer; a pair of oriented transparent containment plates on opposite sides of said electrode pair; and means for providing an electrical energizing signal across said electrode pair, to drive the display, said energizing signal having an activation signal portion of sufficient voltage potential to activate and change the optical state of the display; the improvement wherein:
   the display includes means for superimposing an A.C. voltage signal upon said activation signal portion, said A.C. voltage signal having a frequency sufficient to increase the apparent viewing cone angle for the display.

8. The liquid crystal display of claim 7 wherein said activation signal portion consists of a continuously applied D.C. voltage signal, and said A.C. voltage signal has a square waveform.

9. The liquid crystal display of claim 7 wherein said activation signal portion comprises one or more regularly recurring pulses.

10. A method for broadening the apparent viewing cone for a liquid crystal display, said method comprising the following steps:
 (i) driving said display with an electrical energizing signal comprising an activation signal portion of sufficient voltage potential to activate and change the optical state of the display; and
 (ii) superimposing upon said activation signal portion an A.C. voltage signal having a frequency sufficient to increase the apparent viewing cone angle for the display.

* * * * *